(12) United States Patent
Adeel et al.

(10) Patent No.: US 11,985,058 B2
(45) Date of Patent: May 14, 2024

(54) INTERSERVICE COMMUNICATION OPTIMIZATION FOR MICROSERVICES

(71) Applicants: Getac Technology Corporation, Taipei (TW); WHP Workflow Solutions, Inc., North Charleston, SC (US)

(72) Inventors: Muhammad Adeel, Edina, MN (US); Thomas Guzik, Edina, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 17/880,991

(22) Filed: Aug. 4, 2022

(65) Prior Publication Data

US 2024/0048476 A1    Feb. 8, 2024

(51) Int. Cl.
*H04L 43/067* (2022.01)
*H04L 45/00* (2022.01)
*H04L 45/02* (2022.01)

(52) U.S. Cl.
CPC ............ *H04L 45/22* (2013.01); *H04L 43/067* (2013.01); *H04L 45/02* (2013.01)

(58) Field of Classification Search
CPC ........ H04L 45/22; H04L 43/067; H04L 45/02
USPC ...................................................... 709/238
See application file for complete search history.

(56) References Cited

U.S. PATENT DOCUMENTS

| 9,043,196 | B1* | 5/2015 | Leydon | G06F 40/289 |
| | | | | 704/4 |
| 11,032,164 | B1* | 6/2021 | Rothschild | H04L 41/40 |
| 11,457,080 | B1* | 9/2022 | Meduri | H04L 67/60 |
| 11,563,636 | B1* | 1/2023 | Kairali | H04L 67/562 |

(Continued)

FOREIGN PATENT DOCUMENTS

| KR | 20180028520 A | 3/2018 |
| KR | 20190045049 A | 5/2019 |
| KR | 102050188 B1 | 11/2019 |

OTHER PUBLICATIONS

International Application No. PCT/US2023/028878, International Search Report and Written Opinion mailed Nov. 14, 2023, 11 pages.

(Continued)

*Primary Examiner* — Anthony Mejia
(74) *Attorney, Agent, or Firm* — Finnegan, Henderson Farabow, Garrett & Dunner, L.L.P.

(57) ABSTRACT

A communication broker service of a microservices platform may direct a distributed queue management service to monitor multiple data distribution outboxes of a plurality of microservices of the microservices platform for message data. The communication broker service may receive an indication from the distributed queue management service that the distributed queue management service has retrieved message data from a data distribution outbox of a first microservice. The communication broker service may apply a business logic to identify one or more second microservices that are configured to receive the message data from the first microservice. The communication broker server (Continued)

may then direct the distributed queue management service to distribute the message data of the first microservice from a data store of the distributed queue management service to one or more corresponding data distribution inboxes of the one or more second microservices.

20 Claims, 5 Drawing Sheets

(56) References Cited

U.S. PATENT DOCUMENTS

| | | | |
|---|---|---|---|
| 2016/0124742 A1 | 5/2016 | Rangasamy et al. | |
| 2018/0255009 A1* | 9/2018 | Chen | G06Q 50/01 |
| 2019/0095498 A1 | 3/2019 | Srinivasan et al. | |
| 2019/0273746 A1 | 9/2019 | Coffing | |
| 2020/0036789 A1 | 1/2020 | Mehta et al. | |
| 2020/0042365 A1 | 2/2020 | Tanna et al. | |
| 2020/0117477 A1* | 4/2020 | Aly | G06F 8/60 |
| 2020/0162380 A1 | 10/2020 | Pilkington et al. | |
| 2021/0218819 A1 | 7/2021 | Lawson et al. | |
| 2021/0240544 A1* | 8/2021 | Ramachandran | G06F 9/262 |
| 2021/0336872 A1* | 10/2021 | Singh | H04L 45/26 |
| 2022/0014459 A1* | 1/2022 | Ganguli | H04L 67/289 |
| 2022/0121566 A1* | 4/2022 | Guim Bernat | G06F 12/0292 |
| 2022/0150666 A1* | 5/2022 | Kozhaya | H04W 64/006 |
| 2022/0224637 A1* | 7/2022 | S | H04L 63/0281 |
| 2022/0417219 A1* | 12/2022 | Sheriff | H04L 67/56 |
| 2023/0016946 A1* | 1/2023 | Wouhaybi | G06F 16/901 |
| 2023/0259415 A1* | 8/2023 | Kairali | G06F 9/547 |
| | | | 719/328 |
| 2023/0266972 A1* | 8/2023 | Rogers | G06F 9/30087 |
| | | | 712/214 |

OTHER PUBLICATIONS

International Application No. PCT/US2023/028873, International Search Report and Written Opinion mailed Nov. 15, 2023, 8 pages.

* cited by examiner

INTERSERVICE COMMUNICATION OPTIMIZATION FOR MICROSERVICES

BACKGROUND

The microservices architecture is a software architecture in which a software application is structured as a set of discreet services that perform separate tasks to achieve data processing objectives. The microservices may be loosely coupled and independently deployed or removed as the functionalities of the software application is updated. In some instances, the microservices that make ups the software application may communicate with each other via RESTful application program interfaces (APIs), in which the data exchanged by the microservices are stateless. In other words, each of the microservices does not depend on any previously stored context to process the current data from another microservice. The microservices architecture has several advantages over a traditional monolithic software architecture. For example, a microservice may be independently modified or redeveloped without affecting the stability of the overall software system architecture. This means that a software development team may work on a particular microservice without affecting the remaining functionalities of the software application. Furthermore, each of the microservices may be independently scalable as usage demand for the software application increases. This means that computation resources can be scaled up for certain high demand microservices of the software application rather than for the entire software application.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
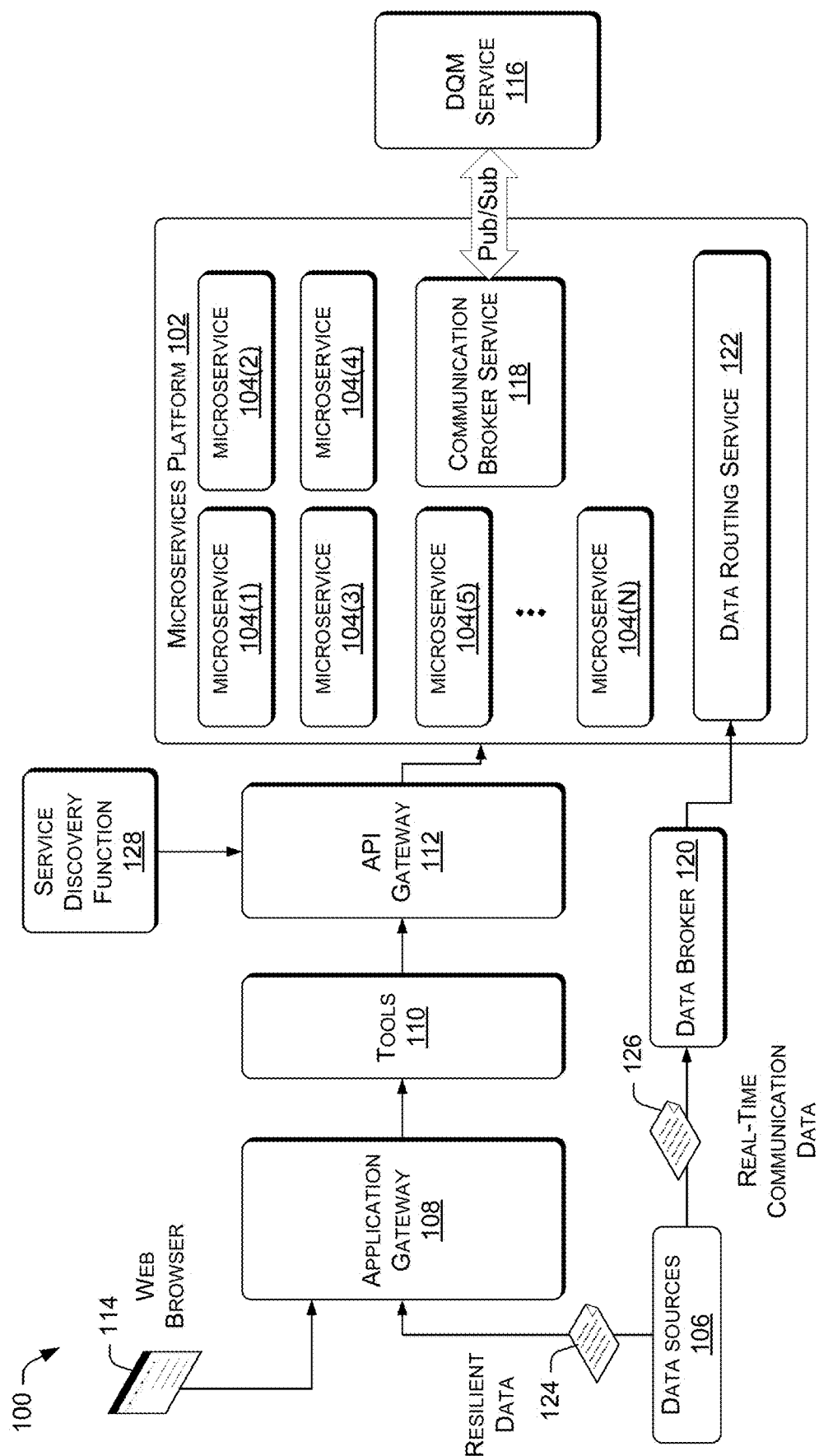
FIG. 1 illustrates an example architecture for implementing optimized interservice communication for microservices of a microservices platform.

This disclosure is directed to techniques for optimizing interservice communication between microservices of a microservices platform. The microservices platform may be a software application that is developed to perform a specific set of processing tasks with respect to incoming data. For example, in some instances, the microservices platform may be a software application that is configured to assist law enforcement agencies with storage, analysis, and retrieval of electronic evidence and police activity data for the purpose of enforcing laws and preventing crime.

In various embodiments, the microservices of the microservices platform may use an optimized publisher-and-subscriber model to communicate with each other. In this publisher-and-subscriber model, each of the microservices is configured with a data distribution inbox and a data distribution outbox. The data distribution inbox of a microservice may enable the microservice to receive input message data from a data source or other microservices so that the microservice may process the received input message data. Likewise, the data distribution outbox of a microservice may enable the microservice to provide output message data to other microservices for further processing by those microservices. The underlying publisher-and-subscriber framework for enabling this model may be provided by a distributed queue management (DQM) service. For example, the service may be provided by the Kafka® Event Hub developed by the Apache Software Foundation, the HiveMQ® MQTT broker developed by the HiveMQ GmbH of Germany, or some other equivalent software service. The distributed queue management service may be configured to subscribe to the data distribution outboxes of all microservices in the microservices platform. The distributed queue management service may be further controlled by a communication broker service that uses the publisher-and-subscriber framework to selectively route message data between various microservices according to business logic.

In operation, a microservice may process incoming data from a data source or another microservice. As a part of its data processing, the microservice may be configured to generate message data that is to be provided to other microservices for additional processing. Accordingly, the microservice may place message data in its data distribution outbox. Since the distributed queue management service subscribes to the data distribution outboxes of all microservices in the microservices platform, the distributed queue management service may become aware that the microservice has placed message data in its data distribution outbox. Subsequently, the distributed queue management service may transfer the message data to its data store and notify the communication broker service that the microservice has published the message data. In turn, the communication broker service may apply a business logic to determine one or more additional microservices that are preconfigured by the business logic to receive the message data from the microservice. Once the one or more additional microservices are identified, the communication broker service may direct the distributed queue management service to distribute the message data to the one or more corresponding data distribution inboxes of the one or more additional microservices.

The use of the communication broker service to control the distribution of message data by the distributed queue management service provides several advantages. First, the microservices no longer have to be configured to directly call the API of other microservices to exchange data with those microservices. Further, in a traditional publisher-and-subscriber model, each microservice of a microservices platform has to subscribe to the data distribution outboxes of all other microservices in the platform. In this scenario, if a microservice publishes message data to its data distribution outbox, each of the other microservices has to retrieve the message data, access the message data to determine the relevancy of the message data, and ultimately discard the message data if the message data is not relevant to the microservice. Such undifferentiated data subscription, data retrieval, and data processing by multiple microservices for each published message data, may needlessly waste computation resources and may also create processing lag when large volumes of message data need to be exchanged between microservices. In contrast, the use of the communication broker service to control the distribution of message data by the distributed queue management service may reduce or eliminate such computational waste and data processing lag.

In additional embodiments, only data that is required to meet specific data resiliency requirements is routed to and between microservices via a publisher-and-sub scriber model provided by the distributed queue management service under the control of a communication broker service. Other types of data, such as real-time communication data, may be routed directly to a web service or a microservice of the microservices platform by a data routing service without using the publisher-and-subscriber model. For example, the data routing service may be a Message Queuing Telemetry Transport (MQTT) data routing service that routes the data to the web service or the microservice via the gRPC protocol. Example implementations are provided below with reference to the following FIGS. 1-5.

Example Architecture

FIG. 1 illustrates an example architecture 100 for implementing optimized interservice communication for microservices of a microservices platform. The architecture 100 may include a microservices platform 102 that is developed to perform a specific set of processing tasks with respect to incoming data. For example, in some instances, the microservices platform 102 may be a software application that is configured to assist law enforcement agencies with storage, analysis, and retrieval of electronic evidence and police activity data for the purpose of enforcing laws and preventing crime. The microservices platform 102 may include microservices 104(1)-104(N) that independently perform different processing tasks on data, such as data orginating from one or more data sources 106 and/or other microservices, to achieve data process objectives. In some instances, data from the data sources 106 may reach the various microservices 104(1)-104(N) of the microservices platform 102 via an application gateway 108, tools 110, and/or the API gateway 112. For example, the application gateway 108 may be responsible for receiving data from one or more data collection devices of the data sources 106.

In the context of law enforcement use, example data collection devices may include multimedia cameras that record audio and/or video data that are worn by individual law enforcement officers, often referred to as body cams, body-worn sensors that track geolocations, health status (e.g., heart rate, blood pressure, etc.), other evidence gathering devices, such as digital tablets, in-vehicle or portable computers, standalone audiovisual recording equipment (portable audio/visual/multimedia recorders, surveillance UAVs or drones, concealed audio/video surveillance sensors, etc.), and/or so forth of law enforcement officers. The data collection devices may also include sensors that monitor the vehicles or other equipment used by the individual law enforcement officers. The vehicles may include cars, aircraft, boats, and/or so forth. For example, the sensors may include a gun sensor that monitors the time and date that a gun of a law enforcement officer is unholstered and/or fired. In another example, the sensors may include a multimedia camera mounted in a police vehicle, a vehicle sensor that tracks the geolocations of a police vehicle, the driving routes and associate travel/destination time and date of the vehicle, the vehicle health status of the vehicle, and/or so forth. In some embodiments, the application gateway 108 may be implemented using an Azure® Application Gateway or some other comparable application gateway.

The tools 110 may include data management application functions that are powered by the microservices 104(1)-104(N). Thus, the tools 110 may be used to direct the microservices 104(1)-104(N) to perform specific tasks with respect to specific data collected from the data sources 106 via the API gateway 112. For example, in the context of law enforcement use, the tools 110 may include tools that enable a user to review, label, analyze, and/or redact particular data files or data packets that contain evidence, documents, or police activity data. The tools 110 may further include an administrative tool that enables an administrator to manage whether users have permission to perform such tasks. In some embodiments, the tools 110 may be provided by a web application that is accessible via a web browser 114 through the application gateway 108. In some implementations, the API gateway 112 that enables the tools 110 to invoke the microservices 104(1)-104(N) may be a .NET API gateway, such as an Ocelot API gateway. As such, data and data processing requests may be communicated to the microservices platform 102 via the Hypertext Transfer Protocol Secure (HTTPS) protocol or a comparable protocol.

In various embodiments, the microservices 104(1)-104(N) of the microservices platform 102 may use an optimized publisher-and-subscriber model to communicate with each other. In this publisher-and-subscriber model, each of the microservices 104(1)-104(N) is configured with a data distribution inbox and a data distribution outbox. The data distribution inbox of a microservice may enable the microservice to receive input message data from a data source or other microservices so that the microservice may process the received input message data. Likewise, the data distribution outbox of a microservice may enable the microservice to provide output message data to other microservices for further processing by those microservices. The underlying publisher-and-subscriber framework for enabling this model may be provided by a distributed queue management service 116. For example, the service may be provided by the Kafka® Event Hub developed by the Apache Software Foundation, the HiveMQ® MQTT broker developed by the HiveMQ GmbH of Germany, or some other comparable software service. The distributed queue management service 116 may be configured to subscribe to the data distribution outboxes of all microservices in the microservices platform. The distributed queue management service 116 may be further controlled by a communication broker service 118 that uses the publisher-and-subscriber framework to selectively route message data between various microservices according to business logic.

In operation, a microservice, such as the microservice 104(1), may process incoming data from a data source or another microservice. As a part of its data processing, the microservice may be configured to generate message data that is to be provided to other microservices for additional processing. Accordingly, the microservice may place message data in its data distribution outbox. Since the distributed queue management service 116 subscribes to the data distribution outboxes of all microservices in the microservices platform, the distributed queue management service 116 may become aware that the microservice has placed message data in its data distribution outbox. Subsequently, the distributed queue management service 116 may transfer the message data to its data store and notify the communication broker service 118 that the microservice has published the message data.

In turn, the communication broker service 118 may apply a business logic to determine one or more additional microservices (e.g., microservice 104(2) and microservice 104(4)) that are preconfigured by the business logic to receive the message data from the microservice. For example, the business logic may include a routing table that specifies that microservice 104(2) and 104(3) are configured to always receive data that is outputted by the microservice 104(1). Once the one or more recipient microservices are identified based on the business logic, the communication broker service 118 may direct the distributed queue management service 116 to distribute the message data from the microservice to the one or more corresponding data distribution inboxes of the one or more additional microservices.

For example, in the context of law enforcement use, the microservice 104(1) may be a microservice that processes new data from a data source, such as labeling and classification of the data, as well as routing of the data to a data store (e.g., a blob data store) for storage. The microservice 104(1) may be designed to further trigger the microservice 104(2) and the microservice 104(3) to perform additional functions with respect to the data. The microservice 104(2) may be a search microservice that is to be triggered to search the data store for additional data that correlates to the data. The microservice 104(3) may be a command center application that is to be triggered to use a web interface to notify a human administrator at an operation center that a new piece of data has arrived. In such a scenario, the microservice 104(1) may trigger the microservice 104(2) and the microservice 104(3) by placing the data or a link to a storage location of the data as message data in the data distribution outbox of the microservice 104(1). Subsequently, the communication broker service 118 may direct the distributed queue management service 116 to distribute the message data that is collected by the distributed queue management service 116 from the data distribution outbox of the microservice 104(1) to the data distribution inboxes of the microservice 104(2) and the microservice 104(3).

In this way, the use of the communication broker service 118 may prevent data processing bottlenecks between microservices that can occur in a traditional approach where each microservice is responsible for calling a downstream microservice. In the example above, if the microservice 104(2) is offline, the traditional approach may result in the microservice 104(1) passing data to the microservice 104(2) and then receiving a notification that the microservice 104(2) has failed. This may result in the microservice 104(1) halting its data processing operation until microservice 104(2) comes back online so as to verify that the microservice 104(2) has performed its task. However, with the use of the communication broker service 118 in conjunction with the distributed queue management service 116, the distributed queue management service 116 may store the data from the microservice 104(1) in its data store, and then provide the data to the data distribution inbox of the microservice 104(2) when the microservice 104(2) comes back online. In other words, with the implementation of the communication broker service 118 in conjunction with the distributed queue management service 116, the responsibility for ensuring data integrity for the purpose of data resiliency and atomic data operations may be transferred away from the individual microservices 104(1)-104(N) of the microservices platform 102 and to the communication broker service 118. Nevertheless, the microservices may also have the ability to output data directly to a non-microservice application, such as a web service that interfaces with a client application or a web browser.

The business logic (e.g., data routing paths listed in the routing table) that is used by communication broker service 118 may be modified as new microservices are added to the microservices platform 102 or removed from the microservices platform 102, or as the software architecture of the microservices platform 102 is updated. For example, there may be an existing data routing path in a routing table that routes the output data of a first microservice to a second microservice. However, when a third microservice is added to the microservices platform, another data routing path may be added to the routing table that routes the output data of the first microservice to the third microservice. Likewise, the routing table may list routing paths that route the output data of the first microservice to a second microservice and a third microservice of the microservices platform. However, when the second microservice is removed from the microservices, the routing table may be modified so that the routing path for the routing of output data from the first microservice to the second microservice may be eliminated from the routing table. In some embodiments, the tools 110 may include an application that enables a user to modify the business logic via a web interface that is accessible via a web browser, such as the web browser 114. Such ability may simplify the reconfiguration of the microservices platform 102 and/or the development of new microservices for the microservices platform 102.

The microservices platform 102 may further include a service discovery function 120. The service discovery function 120 may route incoming data that initially arrives from the data sources 106 to one or more of the microservices 104(1)-104(N) for processing based on one or more routing parameters, such as data type, device type, and/or so forth. For example, the service discovery function 120 may include logic that dictates that data of one or more first particular data types or from devices of one or more first particular device types are to be initially routed to one or more first microservices for processing, while data of one or more second particular data types or from devices of one or more second particular device types are to be initially routed to one or more second microservices for processing. Such routing may be performed by placing the incoming data or data storage location information of the incoming data in the data distribution inbox of the corresponding microservice. Further, the service discovery function 120 may be configured to determine, based on a data processing request that is invoked using a tool of the tools 110, the appropriate microservice of the microservice 104(1)-104(N) that is to be invoked to process data.

Additionally, the service discovery function 120 may monitor the data characteristics of the data that is routed to the microservices platform 102 by the API gateway 112. For example, the data characteristics may include the data types of data (e.g., biometric sensor data, vehicle sensor data, video data, event notification data, etc.), an amount of each type of data received in a predetermined time period, the device types of the devices that supplied the data, and/or so forth. Based on such data characteristics, the service discovery function 120 may instantiate one or more instances of at least one microservice or terminate one or more additional instances of at least one microservice based on the changes in data processing demands that correlate to the data characteristics of the data that passes through the API gateway 112. Alternatively, or concurrently, the service discovery function 120 may instantiate one or more instances of at least one microservice or terminate one or more additional instances of at least one microservice based on the number and types of functionality requests that are invoked through the tools 110. In some instances, the service discovery function 120 may be implemented using the Consul® discovery service developed by HashiCorp.

As an alternative, data from the data sources 106 may reach the various microservices 104(1)-104(N) of the microservices platform 102 for processing via a data broker 122 and a data routing service 124. For example, the data broker 122 may be implemented using the HiveMQ MQTT broker, and the data routing service may be an MQTT router. In various embodiments, this alternative data distribution pathway may be used for distributing data that does not need to meet the same requirements for data integrity and resiliency as other data that is deemed to be critical enough to be distributed via the implementation of the communication broker service 118 in conjunction with the distributed queue management service 116. Instead, such data may be distributed to a microservice or a web service in the most expedient way possible for processing. For example, such distribution may avoid the delay caused by the queueing of message data by the distributed queue management service 116 during peak platform usage times. In various embodiments, the data that is distributed to one or more microservices or a web service may be real-time communication data. The real-time communication data includes data whose value is time-sensitive, meaning that the value may degrade or become worthless if not processed, used, and/or acted upon in an expedient manner. For example, in the context of law enforcement use, the real-time communication data may include the real-time geolocation of a law enforcement officer that is chasing a suspect, in which the real-time geolocation is to be rendered on a digital map accessible to a web browser by a microservice or a web service. Thus, any delay in processing or using the data may mean that the additional officers may be dispatched to an outdated geolocation, resulting in the officers being unable to timely reach a current location of the law enforcement officer to render aid or capture suspects. In another example, a real-time notification may come from a user device of a law enforcement officer indicating that a crime is in progress at a particular geolocation. Once again, there may be a need to quickly render the location of the crime event on a digital map so that additional officers can timely respond to the location to arrest suspects or render aid.

Thus, the application gateway 108 and the data broker 122 may be configured to divide up the distribution of data from the data sources 106 by data type. For example, non-real-time communication data that are required to meet higher data integrity and atomic data operation requirements, a.k.a., resilient data 126, may be provided by the application gateway 108 to the microservices 104(1)-104(N) via the publisher-to-subscriber model. In contrast, real-time communication data 128 may be distributed to one or more microservices or one or more web services via the data broker 122 and the data routing service 124. For example, the data routing service 124 may use the gRPC protocol to distribute the real-time communication data to a microservice for processing or to a web socket of a web service that is running a gRPC host for rendering on a webpage. In such embodiments, a data source device that is sending data may include an internal routing logic that directs the device to send resilient data 126 from the device to the microservices platform 102 via the application gateway 108, and the real-time communication data 128 from the device to the microservices platform 102 via the data broker 122. In alternative embodiments, the real-time communication data 128 may reach the microservices platform 102 via the API gateway 112, but then the communication broker service 118 or another routing service function of the microservice of the microservices platform 102 may determine that since the incoming data is real-time communication data instead of resilient data, the real-time communication data is to be routed to one or more microservices via the data routing service 124.

Example Components of a Microservice

Figure 2:
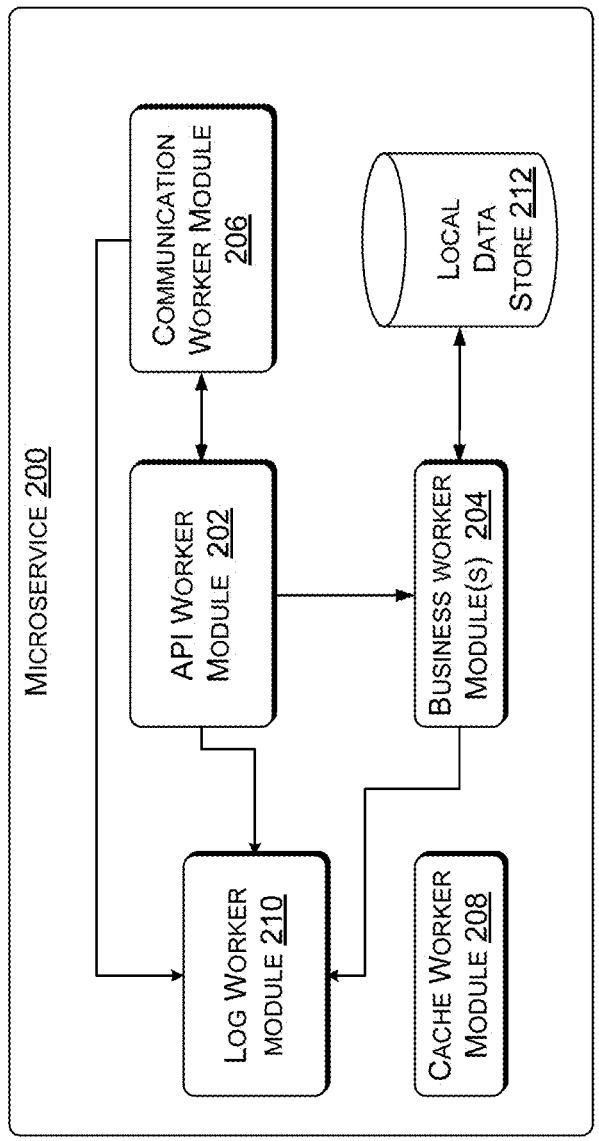
FIG. 2 is a block diagram showing example components of a microservice that uses the optimized interservice communication for microservices.

FIG. 2 is a block diagram showing example components of a microservice that uses the optimized interservice communication for microservices. The example microservice 200 may represent any of the microservices 104(1)-104(N) that are present in the microservices platform 102. The example microservice 200 may include an API worker module 202, one or more business worker modules 204, a communication worker module 206, a cache worker module 208, a log worker module 210, and a local data store 212. Each of these modules may include routines, program instructions, objects, and/or data structures that are executable by a processor to perform particular tasks or implement particular abstract data types. The API worker module 202 may be configured to orchestrate the various data processing tasks that are performed by the microservice 200 for incoming data. For instance, when the API worker module 202 determines that the microservice 200 has received incoming data for which a data processing method is to be performed, the API worker module 202 may allocate one or more of the business worker modules 204 to each perform a particular data processing operation of the data processing method on the incoming data. The API worker module 202 may allocate multiple business worker modules to perform their operations concurrently and/or consecutively. Each of the business worker modules 204 may perform its operation to produce output data, which may be further processed by another business worker module and/or stored in a storage location, e.g., a data table, a data store, and/or so forth.

In some embodiments, the business worker modules 204 may store the output data or processed data in the local data store 212. In other embodiments, the business worker modules 204 may store such output data or processed data in a centralized data storage, such as an on-premises or cloud-based binary large object (blob) storage, and store data management data for the data that are stored in the blob storage (e.g., links to blob data files, index keys of the blob data files, and other metadata for the blob data files) in the local data store 212. Such data management data stored in the local data store 212 may enable the microservice 200 to access and retrieve stored data from the centralized cloud storage. For example, the API worker module 202 of the microservice 200 may invoke another microservice that is configured to interface with the centralized data storage with the corresponding metadata in order to store and/or retrieve data files from the centralized data storage. In various embodiments, the local data store 212 may include one or more Structured Query Language (SQL) databases that are configured for dedicated use by the microservice 200.

The communication worker module 206 may be called upon by the API worker module 202 to interface with the publisher-to-subscriber framework. For example, the communication worker module 206 may retrieve input data from the data distribution inbox of the microservice 200 and provide the input data to the one or more business worker modules 204 for processing by the one or more business worker modules 204. The communication worker module 206 may also place output data generated by the microservice 200 in a data distribution outbox of the microservice 200. In some instances, the communication worker module 206 may be configured to also receive input data directly from the data routing service 124. The cache worker module 208 may be used by the API worker module 202 and/or the business worker modules 204 to store output data or processed data generated by one or more worker modules in a data cache for faster access during data processing.

Finally, the log worker module 210 may track the operations that are performed by the other modules of the microservice 200 and store information regarding the operations in an internal log. For example, the information related to an operation may include an identifier of the operation, a description of the operation, a time and date of the operation, a success and/or failure indication for the operation, and/or so forth.

Example Server and Computing Device Components

Figure 3:
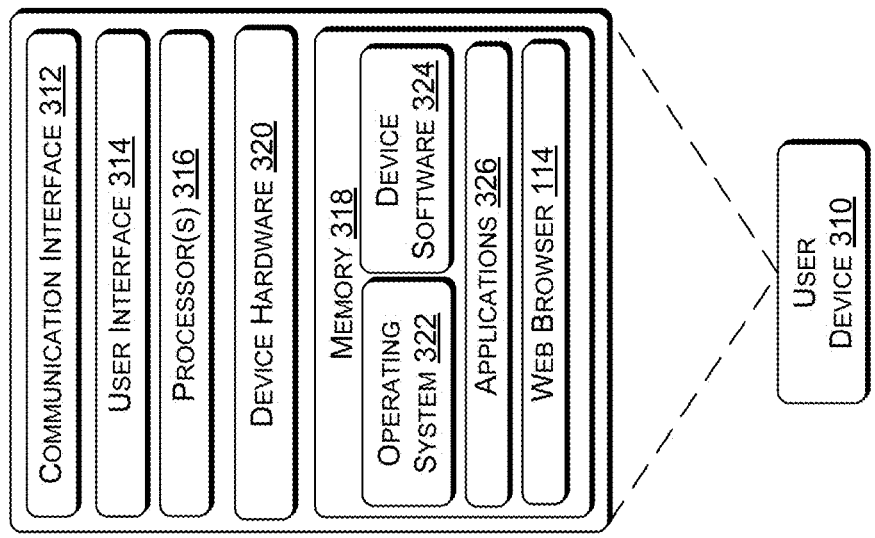
FIG. 3 is a block diagram showing various components of one or more servers and a computing device that support the implementation of optimized interservice communication for microservices.
Figure 3:
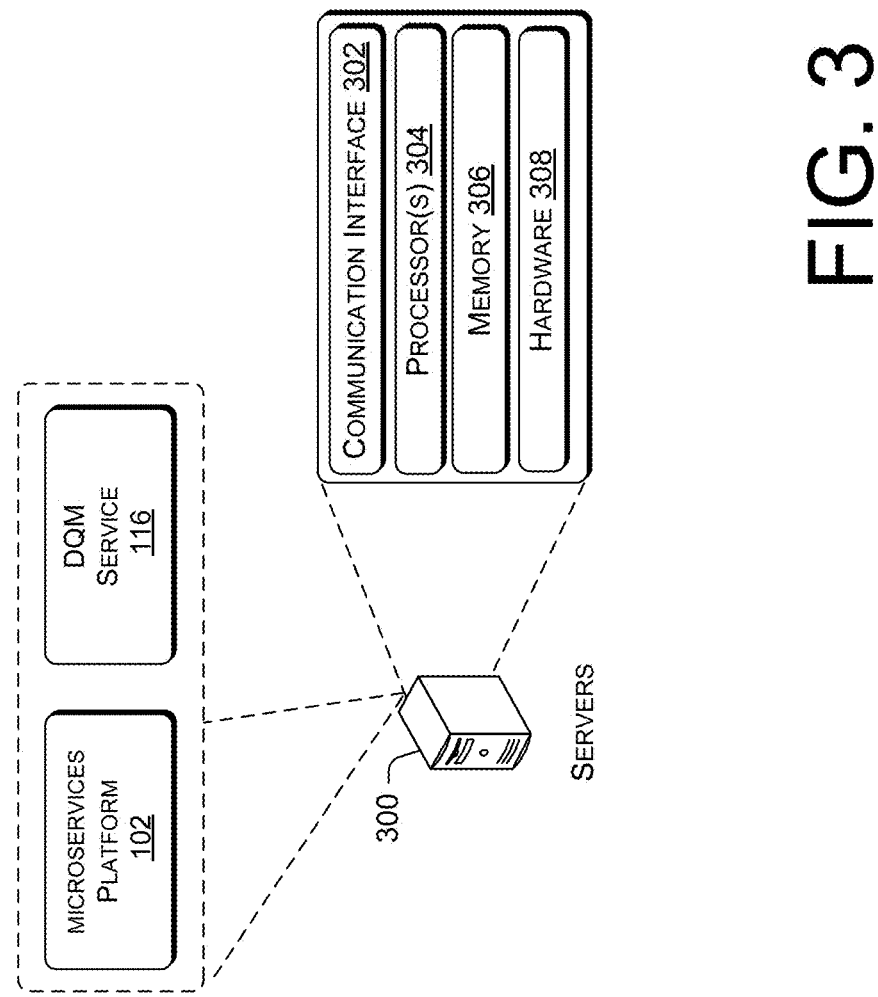

FIG. 3 is a block diagram showing various components of one or more servers and a computing device that support the implementation of optimized interservice communication for microservices. The one or more servers 300 may be implemented using one or more computing nodes. The computing nodes may include a communication interface 302, one or more processors 304, memory 306, and hardware 308. The communication interface 302 may include wireless and/or wired communication components that enable the servers 300 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the servers 300 or components thereof may be implemented using virtual computing devices in the form of virtual machines or software containers that are hosted in a computing cloud. The computing cloud may include a variety of disaggregated servers that provide virtual application server functionalities and virtual storage functionalities.

For example, the computing cloud may include multiple physical computer servers that are disaggregated via a hypervisor. The physical computer servers each may have one or more processors, memory, at least I/O interface, and/or network interface. The features and variations of the processors, memory, the I/O interface, and the network interface are substantially similar to those described for the servers 300. The computing cloud may include a hypervisor that can delegate calls to any portion of hardware in the underlying physical servers, and upon request generate a virtual machine from the separate portions of hardware. A virtual machine may host not only software applications, components including services, but also virtual web server functionalities and virtual storage/database functionalities.

The virtual machines themselves may be further partitioned into containers, which enable the execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned. The computing cloud may embody an abstraction of services. Common examples include service abstractions such as Platform as a Service ("PAAS"), Infrastructure as a Service ("IAAS"), and Software as a Service ("SAAS"). Accordingly, the servers 300 and/or their computing cloud equivalent may provide an execution environment for the execution of the microservices platform 102 and the distributed queue management service 116. Each of the distributed queue management service 116 and the communication broker service 118 may include routines, program instructions, objects, and/or data structures that are executable by a processor to perform particular tasks or implement particular abstract data types. The execution environment may be further used for the execution and/or implementation of other components (e.g., gateways, tools, brokers, functions, data stores, etc.) illustrated in FIG. 1.

As further shown in FIG. 3, a user device 310 may be representative of any user device that may be used to interface with the microservices platform 102. The user device 310 may include a communication interface 312, a user interface 314, one or more processors 316, memory 318, and device hardware 320. The communication interface 312 may include wireless and/or wired communication components that enable the electronic device to transmit or receive voice or data communication via the wireless carrier network, as well as other telecommunication and/or data communication networks.

The user interface 314 may enable a user to provide inputs and receive outputs from the 310. The user interface 314 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 318 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 320 may include a modem that enables the user device 310 to perform telecommunication and data communication with a network. The device hardware 320 may further include signal converters, antennas, hardware decoders and encoders, graphics processors, a universal integrated circuit card (UICC) or an embedded UICC (eUICC), and/or the like that enable the user device 310 to execute applications and provide telecommunication and data communication functions.

The one or more processors 316 and the memory 318 of the user device 310 may implement an operating system 322, device software 324, one or more applications 326, and the web browser 114. Such software may include routines, program instructions, objects, and/or data structures that are executed by the processors 316 to perform particular tasks or implement particular abstract data types.

The operating system 322 may include components that enable the user device 310 to receive and transmit data via various interfaces (e.g., user controls, communication interface 312, and/or memory input/output devices). The operating system 322 may also process data using the one or more processors 316 to generate outputs based on inputs that are received via the user interface 314. For example, the operating system 322 may provide an execution environment for the execution of the applications 326 and the web browser 114. The operating system 322 may include a presentation component that presents the output (e.g., display the data on an electronic display, store the data in memory, transmit the data to another electronic device, etc.).

The operating system 322 may include an interface layer that enables applications to interface with the modem and/or the communication interface 312. The interface layer may comprise public APIs, private APIs, or a combination of both public APIs and private APIs. Additionally, the operating system 322 may include other components that perform various other functions generally associated with an operating system. The device software 324 may include software components that enable the user device to perform functions. For example, the device software 324 may include basic input/output system (BIOS), bootrom, or a bootloader that boots up the user device 310 and executes the operating system 322 following power-up of the device.

The applications 326 may include applications that provide utility, entertainment, and/or productivity functionalities to a user of the user device 310. The web browser 114 may enable a user to access web pages for interacting with various functionalities offered by the microservices platform 102.

Example Processes

Figure 4:
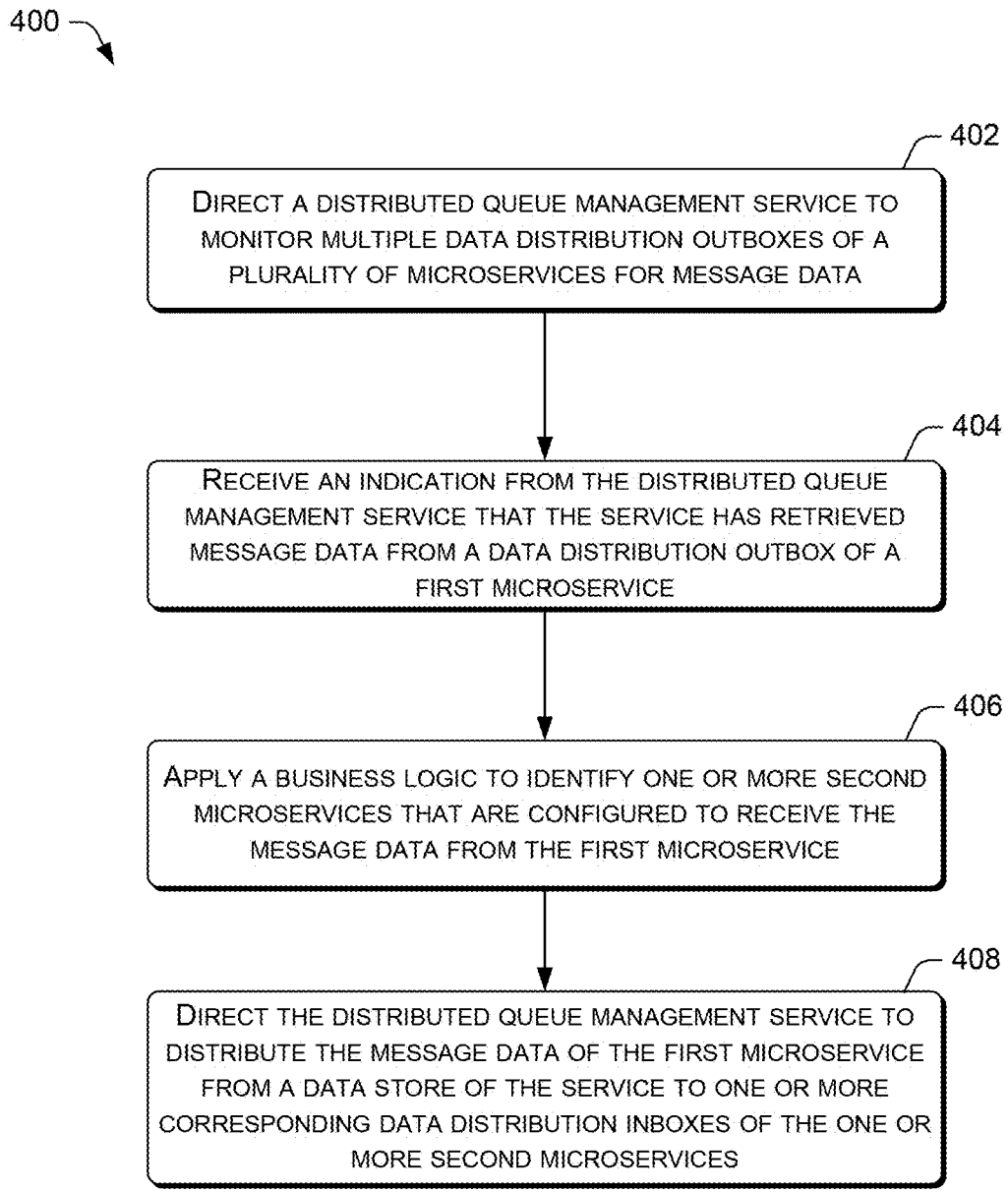
FIG. 4 illustrates a flow diagram of an example process for routing data resilient message data between microservices under the direction of a communication service that controls a distributed queue management platform.
Figure 5:
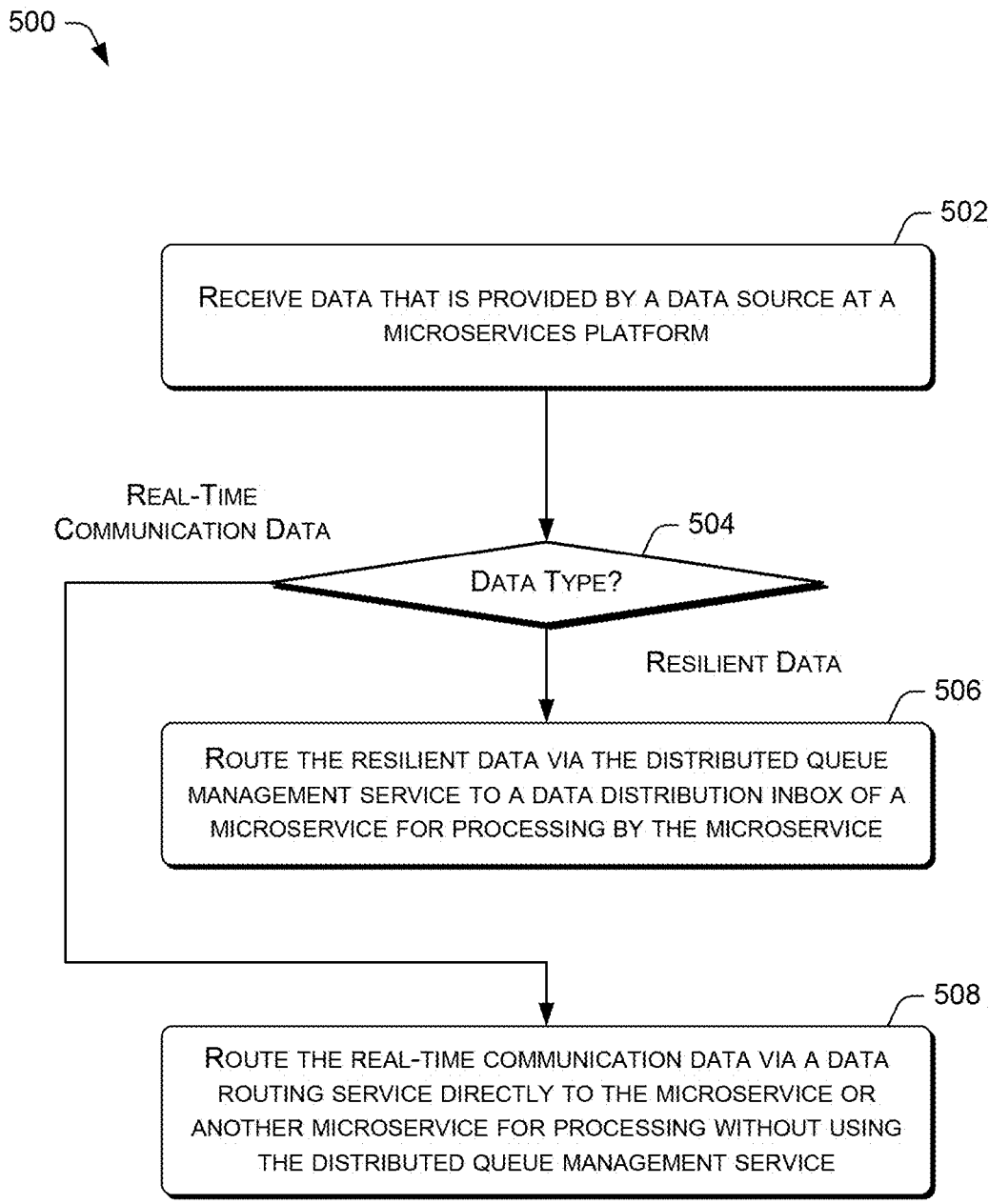
FIG. 5 illustrates a flow diagram of an example process for selectively routing data to microservices via a data routing service or a distributed queue management platform that is under the control of a communication service based on a data type of the data.

FIGS. 4 and 5 present illustrative processes 400 and 500 for implementing optimized interservice communication for microservices of a microservices platform. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described for each process is not intended to be construed as a limitation, and any number of the described blocks can be combined in any order and/or in parallel to implement the process. For discussion purposes, the processes 400 and 500 are described with reference to the architecture 100 of FIG. 1.

FIG. 4 illustrates a flow diagram of an example process 400 for routing data resilient message data between microservices under the direction of a communication service that controls a distributed queue management platform. At block 402, the communication broker service 118 may direct a distributed queue management service, such as the distributed queue management service 116, to monitor multiple data distribution outboxes of a plurality of microservices for messages. In various embodiments, the distributed queue management service may subscribe to the multiple data distribution outboxes of the plurality of microservices. At block 404, the communication broker service 118 may receive an indication from the distributed queue management service that the service has retrieved message data from a data distribution outbox of a first microservice. The message data may include non-real-time communication data, i.e., resilient data. In various embodiments, the distributed queue management service may retrieve the message data after detecting that the first microservice has placed the message data in its data distribution outbox. The distributed queue management service may store the retrieved message data in a data store of the distributed queue management service.

At block 406, the communication broker service 118 may apply a business logic to identify or more second microservices that are configured to receive the message data from the first microservice. For example, the communication broker service 118 may access a routing table that lists the data routing paths between various microservices. At block 408, the communication broker service 118 may direct the distributed queue management service to distribute the message data of the first microservice from the data store of the distributed queue management service to one or more corresponding data distribution inboxes of the one or more second microservices.

FIG. 5 illustrates a flow diagram of an example process 500 for selectively routing data to microservices via a data routing service or a distributed queue management platform that is under the control of a communication service based on a data type of the data. At block 502, the microservices platform 102 may receive data that is provided by a data source. At decision block 504, if the data is non-real-time communication data, i.e., resilient data, the process 500 may proceed to block 506. At block 506, the resilient data may be routed via the distributed queue management service to a data distribution inbox of a microservice for processing by the microservice. Returning to decision block 504, if the data is real-time communication data, the process 500 may proceed to block 508. At block 508, the real-time communication data may be routed via a data routing service directly to the microservice or another microservice for processing without using the distributed queue management service. In some embodiments, the real-time communication data may also be routed alternatively or concurrently by the data routing service to a web service.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   directing a distributed queue management service to monitor multiple data distribution outboxes of a plurality of microservices of a microservices platform for message data;
   receiving an indication from the distributed queue management service that the distributed queue management service has retrieved message data from a data distribution outbox of a first microservice;
   applying a business logic to identify one or more second microservices that are configured to receive the message data from the first microservice; and
   directing the distributed queue management service to distribute the message data of the first microservice from a data store of the distributed queue management service to one or more corresponding data distribution inboxes of the one or more second microservices.

2. The one or more non-transitory computer-readable media of claim 1, wherein the business logic includes a routing table that provides data routing paths between the plurality of microservices.

3. The one or more non-transitory computer-readable media of claim 2, wherein the acts further comprise receiving a modification to a data routing path when an additional microservice is added or removed from the microservices platform.

4. The one or more non-transitory computer-readable media of claim 1, wherein the distributed queue management service implements a publisher-to-subscriber framework for distributing data between the plurality of microservices.

5. The one or more non-transitory computer-readable media of claim 1, wherein the message data includes non-real-time communication data from a data source, wherein the acts further comprise routing real-time communication data that is received from the data source or an additional data source via a data routing service directly to the first microservice or another microservice without using the distributed queue management service.

6. The one or more non-transitory computer-readable media of claim 5, wherein the data source and the additional data source include a data collection device that is used by a law enforcement officer.

7. The one or more non-transitory computer-readable media of claim 1, wherein the acts further comprising instantiating one or more additional instances of a microservice or terminating the one or more additional instances of the microservice based on data characteristics of data that is routed to the microservices platform, the data characteristics including at least one of data types of the data, an amount of each type of data received in a predetermined time period, or device types of devices that supplied the data.

8. The one or more non-transitory computer-readable media of claim 1, wherein the plurality of microservices provide data processing functions for a set of application tools that are accessible via a web browser.

9. The one or more non-transitory computer-readable media of claim 1, wherein a microservice of the plurality of microservices includes a first worker module that retrieves the message data from a data distribution inbox of the microservice and allocates one or more second worker modules to perform at least one data processing operation based at least on the messege data to generate output data.

10. The one or more non-transitory computer-readable media of claim 9, wherein the first worker module further places the output data in a data distribution outbox of the microservice.

11. The one or more non-transitory computer-readable media of claim 9, wherein the microservice further includes a third worker module that caches the output data or processed data generated by the one or more second worker modules in a local database that is configured for dedicated use by the microservice.

12. A system, comprising:
   one or more processors; and
   memory including a plurality of computer-executable components that are executable by the one or more processors to perform a plurality of actions, the plurality of actions comprising:
      directing a distributed queue management service to monitor multiple data distribution outboxes of a plurality of microservices of a microservices platform for message data;
      receiving an indication from the distributed queue management service that the distributed queue management service has retrieved message data from a data distribution outbox of a first microservice;
      applying a business logic to identify one or more second microservices that are configured to receive the message data from the first microservice; and
      directing the distributed queue management service to distribute the message data of the first microservice from a data store of the distributed queue management service to one or more corresponding data distribution inboxes of the one or more second microservices.

13. The system of claim 12, wherein the business logic includes a routing table that provides data routing paths between the plurality of microservices, and wherein the actions further comprise receiving a modification to a data routing path when an additional microservice is added or removed from the microservices platform.

14. The system of claim 12, wherein the message data includes non-real-time communication data from a data source, wherein the actions further comprise routing real-time communication data that is received from the data source or an additional data source via a data routing service directly to the first microservice or another microservice without using the distributed queue management service.

15. The system of claim 12, wherein the actions further comprising instantiating one or more additional instances of a microservice or terminating the one or more additional instances of the microservice based on data characteristics of data that is routed to the microservices platform, the data characteristics including at least one of data types of the data, an amount of each type of data received in a predetermined time period, or device types of devices that supplied the data.

16. The system of claim 12, wherein the plurality of microservices provide data processing functions for a set of application tools that are accessible via a web browser.

17. The system of claim 12, wherein a microservice of the plurality of microservices includes a first worker module that retrieves the message data from a data distribution inbox of the microservice and allocates one or more second worker modules to perform at least one data processing operation based at least on the messege data to generate output data.

18. The system of claim 17, wherein the first worker module further places the output data in a data distribution outbox of the microservice.

19. The system of claim 17, wherein the microservice further includes a third worker module that caches the output data or processed data generated by the one or more second worker modules in a local database that is configured for dedicated use by the microservice.

20. A computer-implemented method, comprising:

directing, by a communication broker service of a microservices platform, a distributed queue management service to monitor multiple data distribution outboxes of a plurality of microservices of the microservices platform for message data;

receiving, at the communication broker service, an indication from the distributed queue management service that the distributed queue management service has retrieved message data from a data distribution outbox of a first microservice;

applying, at the communication broker service, a business logic to identify one or more second microservices that are configured to receive the message data from the first microservice; and directing, by the communication broker service, the distributed queue management service to distribute the message data of the first microservice from a data store of the distributed queue management service to one or more corresponding data distribution inboxes of the one or more second microservices.

\* \* \* \* \*